United States Patent
Kang et al.

(10) Patent No.: US 9,153,829 B2
(45) Date of Patent: Oct. 6, 2015

(54) PASSIVE FUEL CELL ASSEMBLY

(75) Inventors: Ku-Yen Kang, Hsinchu (TW);
Ching-Jung Liu, Hsinchu County (TW);
Chun-Ho Tai, Hsinchu (TW);
Chiou-Chu Lai, Hsinchu County (TW)

(73) Assignee: Industrial Technology Research Institute, Hsinchu (TW)

(*) Notice: Subject to any disclaimer, the term of this patent is extended or adjusted under 35 U.S.C. 154(b) by 1269 days.

(21) Appl. No.: 12/496,658

(22) Filed: Jul. 2, 2009

(65) Prior Publication Data
US 2010/0159299 A1 Jun. 24, 2010

(30) Foreign Application Priority Data

Dec. 22, 2008 (TW) .............................. 97150135 A

(51) Int. Cl.
H01M 8/02 (2006.01)
H01M 8/10 (2006.01)
H01M 8/04 (2006.01)

(52) U.S. Cl.
CPC ........ H01M 8/1002 (2013.01); H01M 8/04171 (2013.01); *Y02E 60/521* (2013.01)

(58) Field of Classification Search
CPC ...................................................... H01M 8/02
USPC ....................................................... 429/424
See application file for complete search history.

(56) References Cited

U.S. PATENT DOCUMENTS

| | | | |
|---|---|---|---|
| 2004/0209136 A1 | 10/2004 | Ren et al. | |
| 2006/0051655 A1* | 3/2006 | Yoshitake et al. | 429/40 |
| 2006/0194092 A1* | 8/2006 | Kanai et al. | 429/34 |
| 2008/0318105 A1* | 12/2008 | Burling et al. | 429/30 |
| 2010/0068587 A1* | 3/2010 | Kobayashi et al. | 429/30 |

FOREIGN PATENT DOCUMENTS

| | | |
|---|---|---|
| CN | 101295796 | 10/2008 |
| CN | 101308937 | 11/2008 |
| JP | 2006-134808 | * 5/2006 |
| JP | 2006134808 | 5/2006 |
| JP | 2006-269125 | * 10/2006 |
| JP | 2006269126 | 10/2006 |
| WO | 2005112172 | 11/2005 |

(Continued)

OTHER PUBLICATIONS

"First Office Action of China Counterpart Application", issued on Aug. 1, 2011, p. 1-p. 5, in which the listed references were cited.
"Office Action of Japan Counterpart Application", issued on Jul. 17, 2012, p. 1-p. 7, in which the listed references (JP2006269126, WO2005112172) were cited.

(Continued)

*Primary Examiner* — Ula C. Ruddock
*Assistant Examiner* — Jacob Marks
(74) *Attorney, Agent, or Firm* — Jianq Chyun IP Office

(57) ABSTRACT

A passive fuel cell assembly including a membrane electrode assembly, an anode current collector, a cathode current collector, a hydrophilic and gas-impermeable layer, and a gas-liquid separation layer is provided. The anode current collector and the cathode current collector are disposed at two opposite sides of the membrane electrode assembly. The hydrophilic and gas-impermeable layer is disposed on the anode current collector. The gas-liquid separation layer is disposed on the hydrophilic and gas-impermeable layer, such that the hydrophilic and gas-impermeable layer is disposed between the gas-liquid separation layer and the anode current collector.

10 Claims, 5 Drawing Sheets

(56) References Cited

FOREIGN PATENT DOCUMENTS

| | | |
|---|---|---|
| WO | 2006040961 | 4/2006 |
| WO | 2008072363 | 6/2008 |

OTHER PUBLICATIONS

"Third Office Action of China Counterpart Application", issued on Jul. 9, 2012, p. 1-p. 7, in which the listed reference (WO2008072363) was cited.

* cited by examiner

PASSIVE FUEL CELL ASSEMBLY

CROSS-REFERENCE TO RELATED APPLICATION

This application claims the priority benefit of Taiwan application serial no. 97150135, filed on Dec. 22, 2008. The entirety of the above-mentioned patent application is hereby incorporated by reference herein and made a part of this specification.

BACKGROUND OF THE INVENTION

1. Field of the Invention

The present invention relates to a fuel cell, and more particularly to a passive fuel cell assembly.

2. Description of Related Art

With the rapid development of industry, the consumption of conventional energy source such as coal, petroleum, and natural gas is increasingly high, and due to the limited storage of natural energy source, novel alternative energy source may be researched and developed to substitute the conventional energy source, and the fuel cell is taken as an important and practical choice.

In brief, the fuel cell is substantially a power generator that converts chemical energy into electric energy by utilizing the reverse reaction of the water electrolysis. The proton exchanging membrane fuel cell mainly includes a membrane electrode assembly (MEA) and two electrode plates. The MEA includes a proton exchange membrane, an anode catalyst layer, a cathode catalyst layer, an anode gas diffusion layer (GDL) and a cathode GDL. The anode catalyst layer and the cathode catalyst layer are respectively disposed on two sides of the proton conducting membrane, and the anode GDL and the cathode GDL are respectively disposed on the anode catalyst layer and the cathode catalyst layer. Furthermore, two electrode plates include an anode and a cathode, which are respectively disposed on the anode GDL and the cathode GDL.

Currently, the common proton exchanging membrane fuel cell is Direct Methanol Fuel Cell (DMFC), which directly takes the methanol aqueous solution as the source for supplying fuel, and generates currents through the relevant electrode reaction between methanol and oxygen. The reaction formulas of the DMFC are shown as follows:

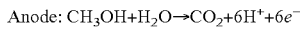

Anode: $CH_3OH+H_2O \rightarrow CO_2+6H^++6e^-$

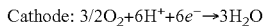

Cathode: $3/2O_2+6H^++6e^- \rightarrow 3H_2O$

During the reaction, 1 mol of water is consumed at anode, three mol of water is generated at the cathode, and the water generated in the reaction may be removed immediately, and cannot be kept at the surface of the catalyst layer, in such a manner, the fuel cell can react continuously, thereby generating currents.

In recent years, passive type fuel transmission in fuel cells is developed, wherein fuel transmission and water management are achieved spontaneously by films designed on the outside of MEA. Since stability of fuel cells is significantly affected by the water management therein. As for the water management in fuel cells, many solutions have been proposed in this field. For instance, in U.S. Publication No. 2004/0209136, a water management layer is used to prevent moisture leaking from an anode. The water management layer includes at least one porous layer mainly made of polytetrafluoroethylene (PTFE). The porous layer allows gaseous fuel to pass through and obstructs water.

In the fuel cell discussed in WO 2005/112172A1, liquid methanol fuel is vaporized and a moisture-maintaining layer is used to prevent the liquid methanol fuel from being diluted. In order to prevent the liquid methanol fuel from being obstructed by the moisture-maintaining layer, the moisture-maintaining layer is defined as followings. According standard of JIS K7126-1987A, gaseous methanol permeability of the moisture-maintaining layer is about $1 \times 10^5 \sim 1 \times 10^9$ cm$^3$/m$^2$·24 hr·atm. However, stability of the fuel cell discussed in WO 2005/112172A1 still deteriorates and inner electrical resistance of the fuel cell increases during a long time operation.

As for discharge design of carbon dioxide in fuel cells, WO 2006/040961 and WO 2006/040961 have proposed their own solutions. During a long time operation, inner electrical resistance in fuel cells proposed by WO 2005/112172A1, WO 2006/04096, or JP 2006-134808 still increases, since water accumulation phenomenon can not be improved. Additionally, since the water management layer of U.S. Publication No. 2004/0209136 and the fuel gas diffusion layer of JP 2006-134808 are hydrophobic and gas-permeable, the distribution of gaseous fuel is not uniform when fuel cell is inclined during operation. The same problem occurs in the moisture-maintaining layer of WO 2005/112172A1. Accordingly, how to improve uniformity of gaseous fuel transmitted to the anode catalyst layer, water accumulation phenomenon at the anode, and stability of fuel cells during a long time operation become crucial issues when fabricating fuel cells.

SUMMARY OF THE INVENTION

The present invention is directed to a passive fuel cell assembly, wherein uniformity of fuel transmitted to an anode catalyst layer and stability during a long time operation is effectively enhanced.

As embodied and broadly described herein, the present invention provides a passive fuel cell assembly. The passive fuel cell assembly includes a membrane electrode assembly, an anode current collector, a cathode current collector, a hydrophilic and gas-impermeable layer, and a gas-liquid separation layer. The hydrophilic and gas-impermeable layer is a hydrophilic material having gas-impermeable characteristic after wetting with liquid. The anode current collector and the cathode current collector are disposed at two opposite sides of the membrane electrode assembly. The hydrophilic and gas-impermeable layer is disposed on the anode current collector. The gas-liquid separation layer is disposed on the hydrophilic and gas-impermeable layer such that the hydrophilic and gas-impermeable layer is disposed between the gas-liquid separation layer and the anode current collector, wherein the hydrophilic and gas-impermeable layer contacts with the gas-liquid separation layer. Additionally, in the present invention, a water absorbent and gas-permeable layer is optionally disposed between the hydrophilic and gas-impermeable layer and the anode current collector so as to increase hydrous degree at the anode side.

Accordingly, since the hydrophilic and gas-impermeable layer of the present invention partially contacts with the gas-liquid separation layer, instability resulted from increased inner electrical resistance can be improved effectively. Additionally, the hydrophilic and gas-impermeable layer is capable of absorbing and then re-distributing the fuel so as to prevent the fuel with high concentration from entering the anode side directly. In comparison with the gaseous fuel containing space discussed in prior arts, the present invention can prevent the water accumulation phenomenon occurred at the anode side effectively.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

In order to make the aforementioned and other objects, features and advantages of the present invention more comprehensible, several embodiments accompanied with figures are described in detail below.

DESCRIPTION OF EMBODIMENTS

Figure 1:
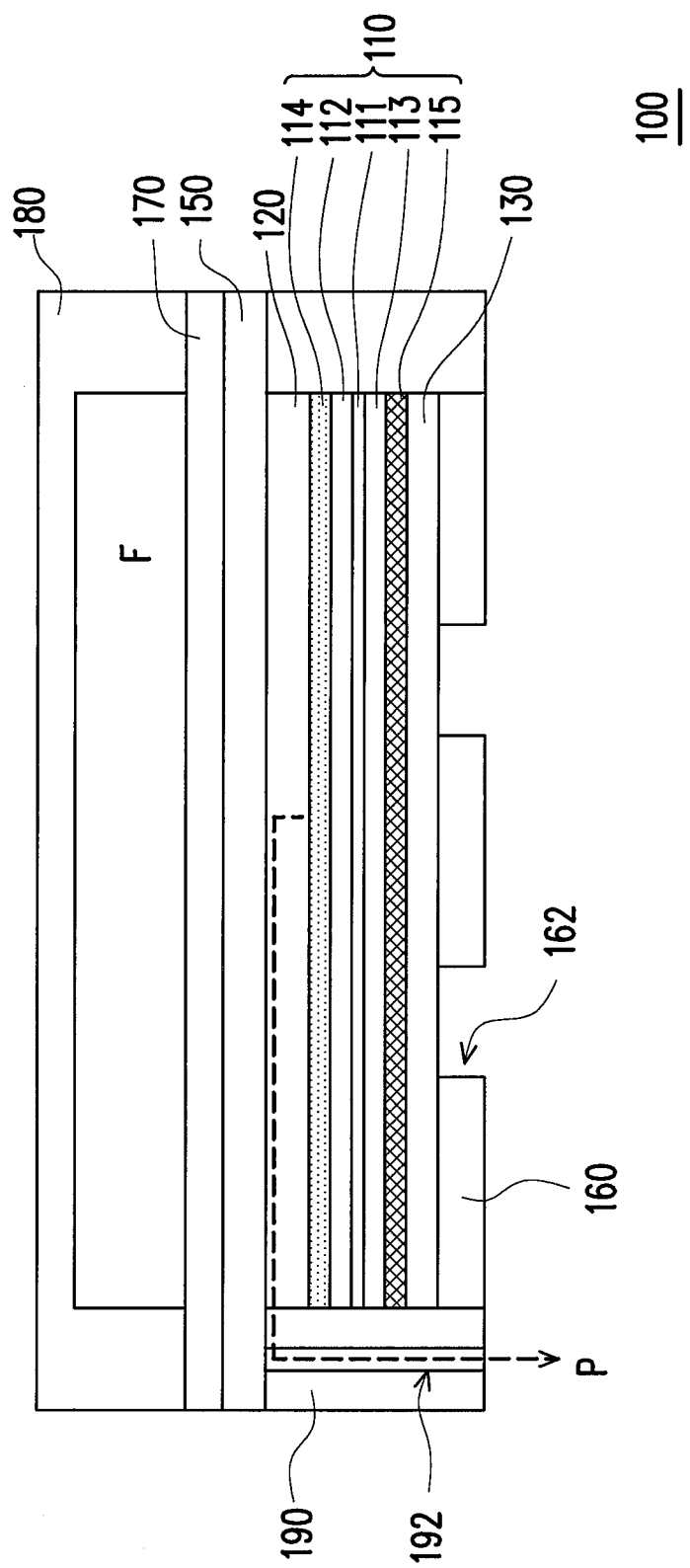
FIG. 1 is a schematic cross-sectional view of a passive fuel cell assembly according to an embodiment of the present invention.

FIG. 1 is a schematic cross-sectional view of a passive fuel cell assembly according to an embodiment of the present invention. Referring to FIG. 1, the passive fuel cell assembly 100 of the embodiment includes a membrane electrode assembly (MEA) 110, an anode current collector 120, a cathode current collector 130, a hydrophilic and gas-impermeable layer 150, and a gas-liquid separation layer 170. The anode current collector 120 and the cathode current collector 130 are disposed at two opposite sides of the membrane electrode assembly 110. The hydrophilic and gas-impermeable layer 150 is disposed on the anode current collector 120. The gas-liquid separation layer 170 is disposed on the hydrophilic and gas-impermeable layer 150 such that the hydrophilic and gas-impermeable layer 150 is disposed between the gas-liquid separation layer 170 and the anode current collector 120, wherein the hydrophilic and gas-impermeable layer 150 partially or entirely contacts with the gas-liquid separation layer 170.

In the embodiment, the membrane electrode assembly 110 includes a proton conducting membrane 111, an anode catalyst layer 112, a cathode catalyst layer 113, an anode gas diffusion layer (GDL) 114, and a cathode gas diffusion layer 115, wherein the anode catalyst layer 112 and the cathode catalyst layer 113 are respectively disposed at two sides of the proton conducting membrane 111, and the anode gas diffusion layer 114 and the cathode gas diffusion layer 115 are disposed on the anode catalyst layer 112 and the cathode catalyst layer 113 respectively. The material of the anode catalyst layer 112 is, for example, Pt/Ru alloy, carbon particles plated with Pt/Ru alloy, carbon particles plated with Pt or other suitable materials. The material of the cathode catalyst layer 113 is, for example, Pt alloy, carbon particles plated with Pt alloy, carbon particles plated with Pt or other suitable materials. The proton conducting membrane 111 is served as the electrolyte membrane for transmitting protons, and the material thereof is, for example, polymeric membrane, which is, for example, Nafion membrane (brand name) fabricated by the DuPont Company, USA. The anode gas diffusion layer (anode GDL) 114 and cathode gas diffusion layer (cathode GDL) 115 are made from carbon paper or carbon cloth or other suitable porous conducting materials. On the anode GDL 114 and the cathode GDL 115, hydrophobic material is coated in different degrees to provide suitable hydrophobic properties for gas diffusion and/or fuel transportation.

In the embodiment, the material of the anode current collector 120 is a conductive material such as titanium or titanium plated with gold. Additionally, the material of the cathode current collector 130 may also be a conductive material.

It is noted that the hydrophilic and gas-impermeable layer 150 is "gas-impermeable" after the hydrophilic and gas-impermeable layer 150 absorbs water. Here, the above-mentioned "gas-impermeable" means that gas-permeability of the hydrophilic and gas-impermeable layer 150 after absorbing water is less than a predetermined value. In the present invention, the predetermined value is not limited to be zero. Specifically, in accordance with the CNS 1357 standard, after the hydrophilic and gas-impermeable layer 150 absorbs water, gas-permeability of the hydrophilic and gas-impermeable layer 150 is greater than 30 seconds/100 ml. In the embodiment, the hydrophilic and gas-impermeable layer 150 is hydrophilic non-woven, hydrophilic carbon fiber, hydrophilic textile, hydrophilic paper, and so on. The hydrophilic and gas-impermeable layer 150 is gas-impermeable after being moistened by liquid (e.g. water). Accordingly, the hydrophilic and gas-impermeable layer 150 is capable of obstructing gaseous fuel and carbon dioxide generated from the anode side. In a preferred embodiment, the thickness of the hydrophilic and gas-impermeable layer 150 is about 100 micro-meters and pore diameter of the hydrophilic and gas-impermeable layer 150 is about 0.5 micro-meter.

In the embodiment, the gas-liquid separation layer 170 ensures that the liquid fuel F can not contact with the anode catalyst layer 112 directly. Accordingly, transmission quantity of the liquid fuel F can be well controlled. After the liquid fuel F is vaporized, the gaseous fuel passes through the gas-liquid separation layer 170 and reaches the hydrophilic and gas-impermeable layer 150. Since the hydrophilic and gas-impermeable layer 150 is gas-impermeable after absorbing water, the gaseous fuel is dissolved in the hydrophilic and gas-impermeable layer 150 once again and diffuses to pass through the hydrophilic and gas-impermeable layer 150. Dissolution of the liquid fuel F is contributive to improve distribution uniformity of the liquid fuel F. After the fuel passing through the hydrophilic and gas-impermeable layer 150, the liquid fuel F is vaporized once again. Then, the vaporized fuel passes through the anode current collector 120 and the anode gas diffusion layer 114 as well as reaches the anode catalyst layer 112. The hydrophilic and gas-impermeable layer 150 is contributive to redistribute the fuel uniformly such that fuel distribution problem of prior arts can be solved by the present invention.

When the above-mentioned fuel cell operates for a long time, condensed liquid may be generated between the anode current collector 120 and the gas-liquid separation layer 170. In the prior art, the condensation of liquid results in deteriorate distribution uniformity of the gaseous fuel and increased inner electrical resistance of the membrane electrode assembly 110. In the embodiment, the hydrophilic and gas-impermeable layer 150 contacts with the gas-liquid separation layer 170. Specifically, the hydrophilic and gas-impermeable layer 150 partially or entirely contacts with the gas-liquid separation layer 170. The condensation of liquid can be improved by the hydrophilic and gas-impermeable layer 150, since the hydrophilic and gas-impermeable layer 150 is capable of absorbing and re-distributing the condensed liquid without affecting fuel supply. In an alternate embodiment, other hydrophilic or water absorbent materials can be interposed between the hydrophilic and gas-impermeable layer 150 and the gas-liquid separation layer 170 so as to ensure stability of contact between the hydrophilic and gas-impermeable layer 150 and the gas-liquid separation layer 170. In comparison with the hydrophobic water management layer (i.e. PTFE) disclosed in U.S. Publication No. 2004/0209136, the hydrophilic and gas-impermeable layer 150 of the embodiment can prevent moisture leaking from an anode. Additionally, the hydrophilic and gas-impermeable layer 150 can improve water accumulation phenomenon and increased inner electrical resistance problem caused by the hydrophobic water management layer.

Figure 2:
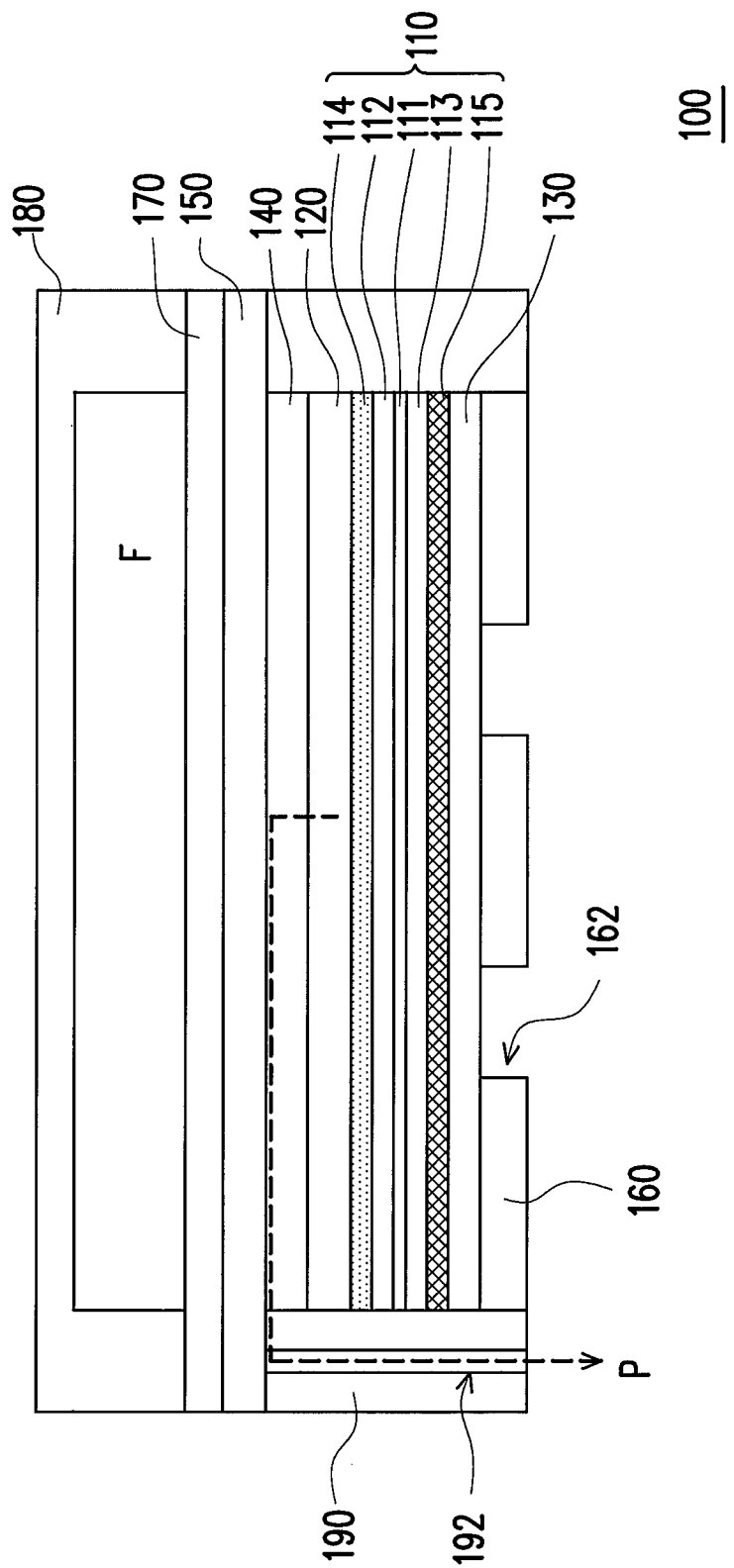
FIG. 2 is a schematic cross-sectional view of a passive fuel cell assembly according to another embodiment of the present invention.

FIG. 2 is a schematic cross-sectional view of a passive fuel cell assembly according to another embodiment of the present invention. Referring to FIG. 2, the passive fuel cell assembly 100 of the embodiment further includes a water-absorbent and gas-permeable layer 140 disposed between the anode current collector 120 and the hydrophilic and gas-impermeable layer 150 to absorb additional water or fuel at the anode side. When operation environment or operation condition changes, the water-absorbent and gas-permeable layer 140 is capable of maintaining inner electrical resistance of the membrane electrode assembly 110 and modulating amount of fuel. Accordingly, operation stability of fuel cell is enhanced. Distribution uniformity of gaseous fuel transmitted to the anode catalyst layer 112 is not influenced by the water-absorbent and gas-permeable layer 140, since the water-absorbent and gas-permeable layer 140 is gas-permeable after absorbing water. In accordance with the CNS 1357 standard, after the water-absorbent and gas-permeable layer 140 absorbs water, gas-permeability of the water-absorbent and gas-permeable layer 140 is less than 15 seconds/100 ml. The material of the water absorbent and gas-permeable layer 140 includes textile, non-woven, paper, foam, expandable Polyurethane (PU), and so on. The material of the water absorbent and gas-permeable layer 140 may be porous materials capable of absorbing liquid (e.g. water). The pore diameter of the porous material is large enough to prevent water accumulation, and thereby maintain the gas-permeability of the water absorbent and gas-permeable layer 140.

Specifically, after absorbing water, the water absorbent and gas-permeable layer 140 is capable of obstructing water leaving from the anode, maintaining humidity in the fuel cell, and maintaining permeability of gaseous fuel. Accordingly, hydrous degree at the anode side in the fuel cell increases and overall stability of fuel cell is enhanced. After the hydrophilic and gas-impermeable layer 150 absorbs water, the carbon dioxide is guided by the hydrophilic and gas-impermeable layer 150 to discharge outside. Additionally, fuel can be absorbed and vaporized once again such that water accumulation phenomenon can be improved.

The passive fuel cell assembly 100 of the embodiment further includes a gas-impermeable layer 160 disposed on the cathode current collector 130. The gas-impermeable layer 160 is in touch with the cathode current collector 130. The material of the gas-impermeable layer 160 is a polyester polymer or a polyolefin polymer, for example. More specifically, the polyester polymer is, for example, polyethylene terephthalate (PET) or polyacrylonitrile (PAN), and the polyolefin polymer is, for example, polyethylene (PE), polypropylene (PP) or other gas-impermeable materials suitable for apertures fabrication. The thickness of the gas-impermeable layer 160 falls within, for example, 10 μm-5 mm. In an embodiment of the present invention, the thickness of the gas-impermeable layer 160 is, for example, about 100 μm. The gas-impermeable layer 160 is used to control the evaporation speed of the water generated from the cathode catalyst layer 113 after the reaction, such that the water generated from the cathode catalyst layer 113 is diffused to the anode catalyst layer 112 via the proton conducting membrane 111. Therefore, water in the cathode catalyst layer 113 can be supplied to the anode catalyst layer 112 for being used in the reaction.

The gas-impermeable layer 160 has at least one aperture 162 so as to control gas-permeability. In the embodiment, a plurality of apertures 162 are shown in the drawing for illustration. However, shape and quantity of the aperture 162 are not limited in the present invention. Since water is generated at the cathode catalyst layer 113 during operation of the passive fuel cell assembly 100, the aperture 162 of the gas-impermeable layer 160 has appropriate dimension for improving water accumulation phenomenon. From experience, in order to prevent the aperture 162 from being blocked by water, the minimum dimension of the aperture 162 is greater than twice of the thickness of the gas-impermeable layer 160, for example. That is, if the aperture 162 is a round aperture, the diameter may be greater than twice of the thickness of the gas-impermeable layer 160. In this embodiment, the diameter of the aperture 162 is about over 200 μm. If the aperture 162 is a rectangular aperture, the length of the short side may be larger than twice of the thickness of the gas-impermeable layer 160, and in this embodiment, the length of the short side of the opening 116 is about over 200 μm. Additionally, the overall aperture ratio of the gas-impermeable layer 160 falls within 0.5%-21%, and in a preferred embodiment of the present invention, the aperture ratio of the gas-impermeable layer 160 is, for example, about 5%.

Figure 3:
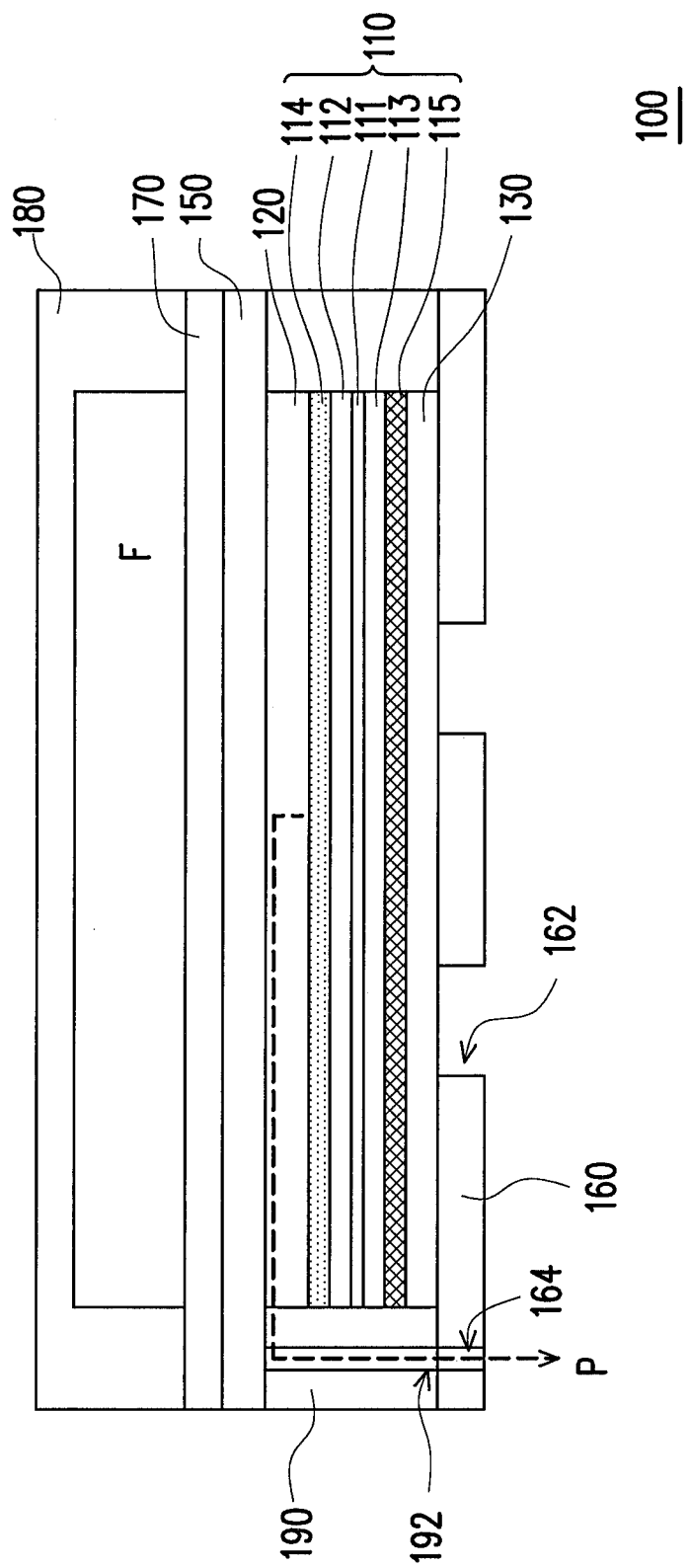
FIG. 3 to FIG. 5 are schematic cross-sectional views of a passive fuel cell assembly according to alternate embodiments of the present invention.

As shown in FIG. 3, the gas-impermeable layer 160 may extend to cover the frame 190 and include a gas discharge channel 164 corresponding to the gas discharge channel 192.

Figure 4:
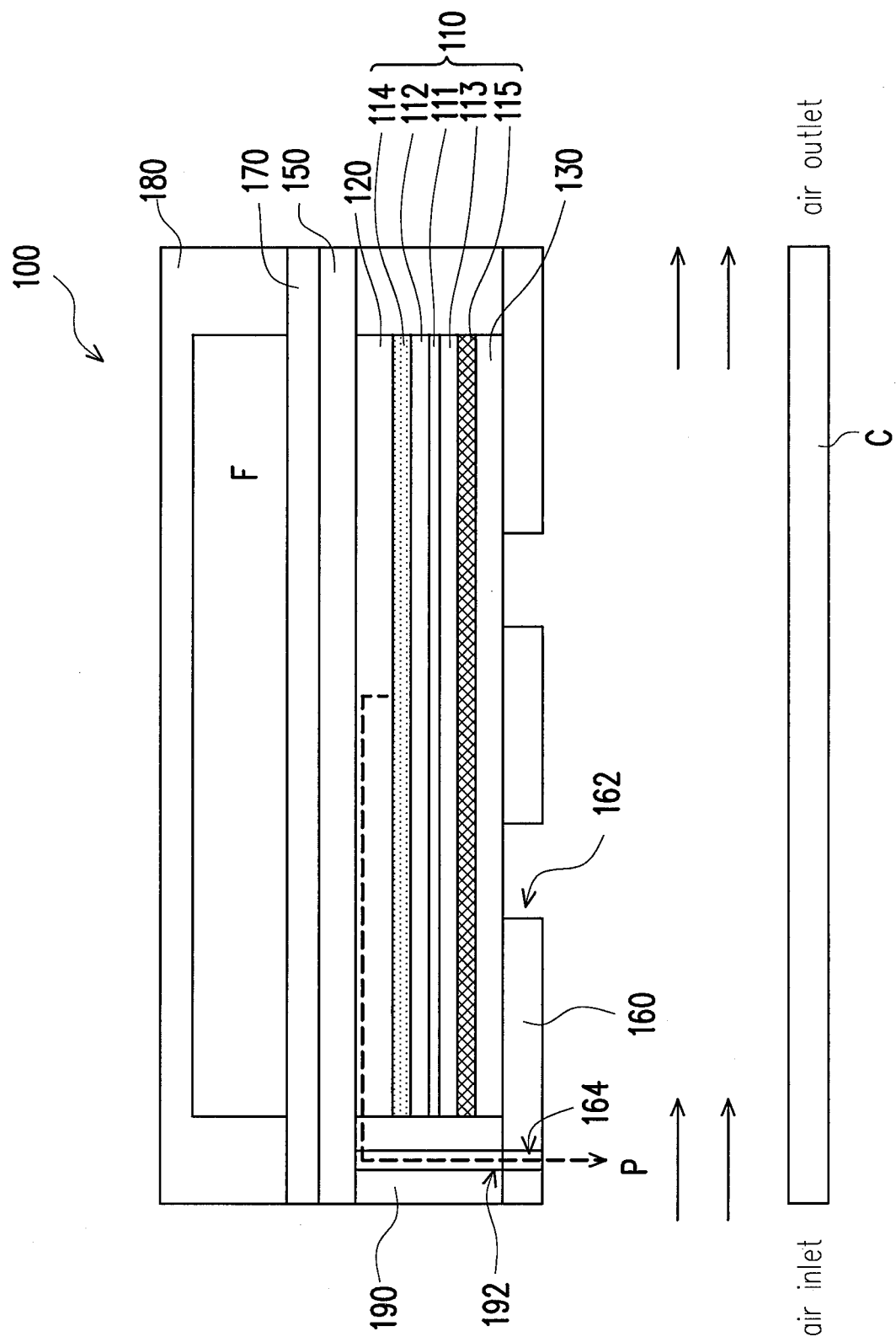

Referring to FIG. 4, the passive fuel cell assembly 100 illustrated in FIG. 3 may be assembled with a case C. The case C may belongs to an electronic product, for example. The case C has at least one air inlet and at least one air outlet, wherein the aperture 162 of the gas-impermeable layer 160 is not exposed by the air inlet and the air outlet directly. In an alternate embodiment of the invention, the case C may include openings corresponding to the apertures 162 of the gas-impermeable layer 160. Additionally, a fan or a blower (not shown) may be assembled with the case C or the passive fuel cell assembly 100 such that air flow between the passive fuel cell assembly 100 and the case C is generated by the blower to apply air required by the cathode However, the case C is not limited to be assembled with the passive fuel cell assembly 100 illustrated in FIG. 3 only, the case C may be assembled with the passive fuel cell assembly 100 illustrated in FIG. 1, FIG. 2, or FIG. 5.

Figure 5:
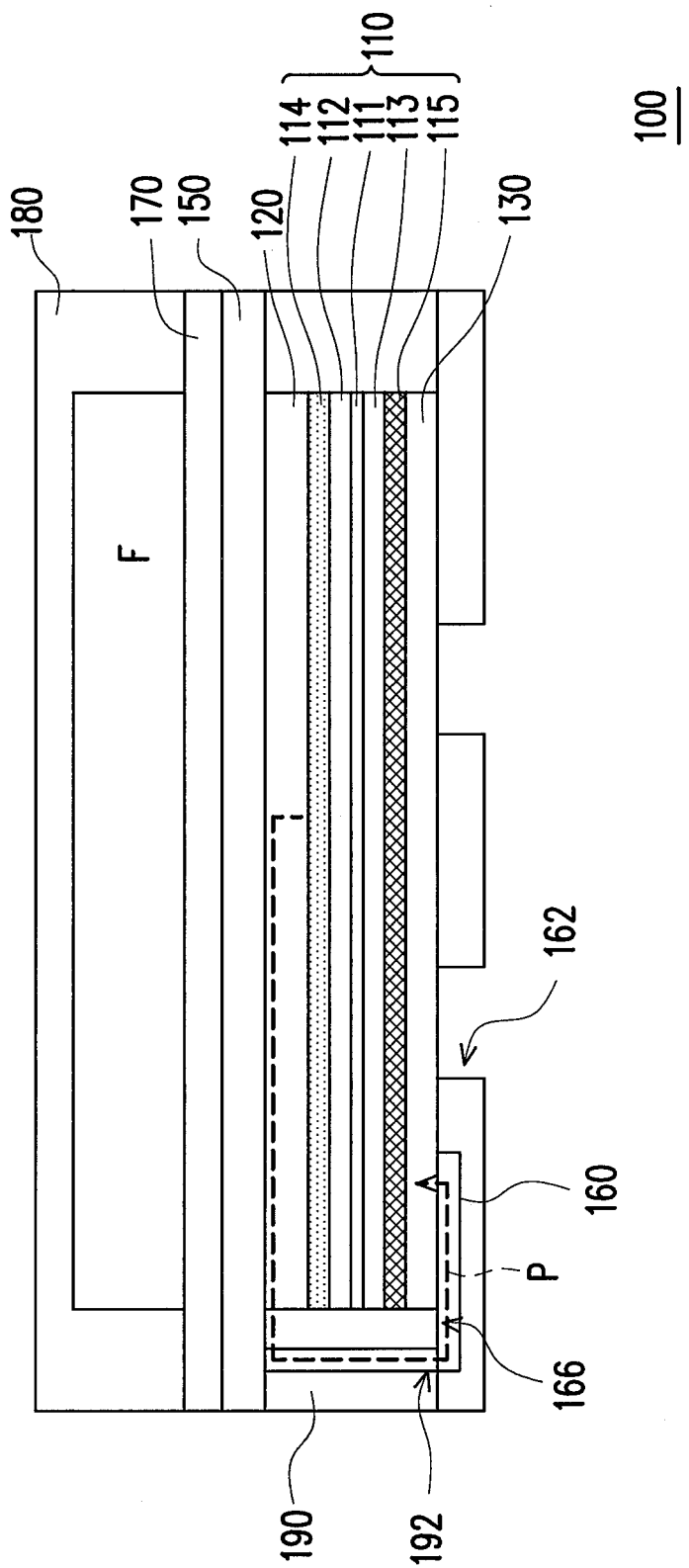

Referring to FIG. 5, in the passive fuel cell assembly 100, the gas-impermeable layer 160 may extend to cover the frame 190 and include a gas guiding channel 166 linked to the gas discharge channel 192. Carbon dioxide is guided to the cathode current collector 130 and the fuel leaked from the gas discharge channel 192 is exhausted through combustion.

The passive fuel cell assembly 100 shown in FIG. 1, FIG. 2, FIG. 3, and FIG. 5 may further includes a hydrophobic porous layer disposed between the cathode current collector 130 and the gas-impermeable layer 160. Since the hydrophobic porous layer can restrain the water from escaping the cathode, the probability of recycling of water is increased by the hydrophobic porous layer.

The passive fuel cell assembly 100 of the embodiment further includes a fuel supply unit 180 for storing a liquid fuel F, wherein the fuel supply unit 180, the anode current collector 120, the hydrophilic and gas-impermeable layer 150, and the gas-liquid separation layer 170 are located at a same side of the membrane electrode assembly 110.

The passive fuel cell assembly 100 of the embodiment further includes a frame 190 for fastening the membrane electrode assembly 110, the anode current collector 120, the cathode current collector 130, the water-absorbent and gas-permeable layer 140, and the hydrophilic and gas-impermeable layer 150. It is noted that the frame 190 has a gas discharge channel 192, wherein the hydrophilic and gas-impermeable layer 150 link with external environment through the gas discharge channel 192 such that gas generated in the fuel cell can be discharged along a path P shown in FIG. 1 and FIG. 2. Specifically, carbon dioxide generated at the anode side passes through the water-absorbent and gas-permeable layer 140 first and is guided by the hydrophilic and gas-impermeable layer 150 to flow into the gas discharge channel 192. In other words, an end of the gas discharge channel 192 is covered by the hydrophilic and gas-impermeable layer 150, and the other end of the gas discharge channel 192 is linked with external environment. Accordingly, carbon dioxide is discharged to external environment through the gas discharge channel 192.

The above-mentioned the hydrophilic and gas-impermeable layer 150 should be partially exposed by the gas discharge channel 192. The dimension, type, quantity, and distribution of the gas discharge channel 192 are not limited in the present invention.

<Experiment 1>

Experimental condition of the passive fuel cell assembly: liquid methanol fuel having volume concentration of greater than 99% is supplied under a predetermined temperature. After experiment is conducted, the passive fuel cell assembly of the embodiment A described below is discharged to ensure that performance of the passive fuel cell assembly is restored to initial state.

Embodiment A: the passive fuel cell assembly shown in FIG. 1, wherein the thickness of the hydrophilic and gas-impermeable layer is about 100 μm.

Embodiment B: the passive fuel cell assembly shown in FIG. 1, wherein the thickness of the hydrophilic and gas-impermeable layer is about 400 μm.

Embodiment C: the passive fuel cell assembly shown in FIG. 2, wherein the thickness of the hydrophilic and gas-impermeable layer is about 100 μm, and the thickness of the water-absorbent and gas-permeable layer is about 200 μm.

Experimental example 1: The hydrophilic and gas-impermeable layer is deleted in passive fuel cell assembly of Embodiment C.

Experimental example 2: The hydrophilic and gas-impermeable layer is replaced by a hydrophobic layer in passive fuel cell assembly of Embodiment C.

TABLE 1

| Fixture Setup | Embodiment A | Embodiment B | Embodiment C | Experimental example 1 | Experimental example 2 |
|---|---|---|---|---|---|
| Sustain time of inner electrical resistance | Δ | ◯ | ◯ | X | Δ |
| Stability of power output | Δ | Δ | ◯ | Δ | X |

X: bad;
Δ: fair;
◯: good

As shown in TABLE 1, in comparison with Experimental example, the passive fuel cell assemblies of the invention (Embodiments A, B, and C) have better performance.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A passive fuel cell assembly, comprising:
   a membrane electrode assembly; an anode current collector;
   a cathode current collector, wherein the anode current collector and the cathode current collector are disposed at two opposite sides of the membrane electrode assembly;
   a hydrophilic and gas-impermeable layer disposed on the anode current collector;
   a water absorbent and gas-permeable layer disposed between the anode current collector and the hydrophilic and gas-impermeable layer; and
   a gas-liquid separation layer disposed on the hydrophilic and gas-impermeable layer such that the hydrophilic and gas-impermeable layer is disposed between the gas-liquid separation layer and the anode current collector, wherein the hydrophilic and gas-impermeable layer contacts with the gas-liquid separation layer, and there is no air gap between the hydrophilic and gas-impermeable layer and the gas-liquid separation layer.

2. A passive fuel cell assembly of claim 1 further comprising a hydrophilic material layer disposed between the hydrophilic and gas-impermeable layer and the gas-liquid separation layer to increase a contact area between the hydrophilic and gas-impermeable layer and the gas-liquid separation layer.

3. A passive fuel cell assembly of claim 1, wherein the water absorbent and gas-permeable layer is a hydrophilic material layer having at least a vent hole.

4. A passive fuel cell assembly of claim 1, wherein a material of the water absorbent and gas-permeable layer comprises textile, non-woven, paper, foam, or expandable Polyurethane (PU).

5. A passive fuel cell assembly of claim 1, wherein a material of the hydrophilic and gas-impenneable layer comprises textile, non-woven, or paper.

6. A passive fuel cell assembly of claim 1 further comprising a cathode gas-impermeable layer disposed on the cathode collector, wherein the gas impermeable layer has at least one aperture.

7. A passive fuel cell assembly as claimed in claim 6, wherein an aperture ratio of the cathode gas-impermeable layer falls within 0.5%-21%.

8. A passive fuel cell assembly as claimed in claim 1 further comprising a frame for fastening the membrane electrode assembly, the anode current collector, and the cathode current collector.

9. A passive fuel cell assembly as claimed in claim 8, wherein the frame has a gas discharge channel, and an end of the gas discharge channel is covered by the hydrophilic and gas-impermeable layer.

10. A passive fuel cell assembly as claimed in claim 1 further comprising a fuel supply unit for storing a liquid fuel, wherein the fuel supply unit, the anode current collector, the gas-liquid separation layer, and the hydrophilic and gas-impermeable layer are located at a same side of the membrane electrode assembly.

* * * * *